United States Patent [19]

Collett

[11] 4,158,506
[45] Jun. 19, 1979

[54] AUTOMATIC DETERMINATION OF THE POLARIZATION STATE OF NANOSECOND LASER PULSES

[75] Inventor: Edward Collett, Lincroft, N.J.

[73] Assignee: The United States of America as represented by the Secretary of the Army, Washington, D.C.

[21] Appl. No.: 852,178

[22] Filed: Nov. 15, 1977

[51] Int. Cl.$^2$ ............................................. G01J 4/04
[52] U.S. Cl. ............................................. 356/365
[58] Field of Search ............... 356/114, 115, 116, 364, 356/365, 366, 367

[56] References Cited

PUBLICATIONS

Born et al., *Principles of Optics*, Pergamon Press, New York, 1959, p. 551.
Dill et al., "Ellipsometry with Pulsed Tunable Laser Sources," *IBM Technical Disclosure Bulletin*, vol. 19, No. 4, Sep. 1976, pp. 1487–1489.

*Primary Examiner*—John K. Corbin
*Assistant Examiner*—R. A. Rosenberger
*Attorney, Agent, or Firm*—Nathan Edelberg; Sheldon Kanars; Bernard Franz

[57] ABSTRACT

An electro-optical system for determining the polarization state of optical pulses of nanosecond durations such as produced by lasers. This is achieved by using a six element optical polarizer assembly positioned in front of a six element optical detector assembly. The respective outputs of the six detectors are fed in predetermined arrangement to a plurality of operational amplifiers which are adapted to provide the sum/difference of the detector outputs for providing the Stokes parameters of an optical pulse incident thereto.

10 Claims, 2 Drawing Figures

AUTOMATIC DETERMINATION OF THE POLARIZATION STATE OF NANOSECOND LASER PULSES

The invention described herein may be manufactured and used by or for the Government for governmental purposes without the payment of any royalties thereon or therefor.

BACKGROUND OF THE INVENTION

This invention relates generally to apparatus for the measurement of optical energy and more particularly to a means for determining the Stokes parameters of extremely short optical pulses in the nanosecond ($1\times10^{-9}$ seconds) of a laser beam.

Previous methods for the determination of polarization of an optical beam assume continuous (CW) operation. Apparatus known as rotating ellipsometers is adapted to determine the polarization; however, it is relatively slow. Current applications of laser beams, however, require a very short "look" time and thus prior art apparatus is not readily adapted to characterize completely the polarization state of laser pulses of ultra short duration time.

As noted above, the polarization state of an optical beam can be determined by traditional ellipso-metric techniques. The inventor is aware of these publications describing such techniques. The first is an article entitled "AIDER: Angle-Of-Incidence Derivative Ellipsometry and Reflectometry" by R. Azzam, which appeared in *Optics Communications,* January, 1976, at page 153. The second comprises the proceedings of the *Symposium On Recent Developments In Ellipsometry,* (N. Holland, 1968) by N. Bashara, et al. and the third is an article entitled "Photometric Ellipsometer for Measuring Partially Polarized Light" by D. E. Aspnes which appeared in the *Journal of the Optical Society of America,* Vol. 65, Nov. 1975 at pp. 1274–1278.

The techniques disclosed in the prior art have basically evolved for DC and CW optical sources. With the introduction of laser sources, however, pulse widths of the order of nanoseconds ($10^{-9}$ secs.) can be generated. Because of these extremely short pulse widths it becomes impossible to analyze the optical field to determine its polarization state using ordinary methods of measurement. Basically the problem is the same, however, which is to determine the polarization state as represented by the Stokes parameters of the generated pulse.

SUMMARY

Briefy, the subject invention is directed to the method and apparatus for determining the Stokes parameters of an optical pulse which involves the arrangement of an optical polarizer assembly consisting of six polarizer elements having respective predetermined angles of transmissivity. A phase plate element is positioned in front of two of these six elements and the respective outputs from the polarizer elements are fed to individual optical detectors, the outputs provide signals corresponding to portions of the Stokes parameters. Respective outputs are combined in sum and difference operational amplifiers to yield signals corresponding to the desired Stokes parameters.

DESCRIPTION OF THE PREFERRED EMBODIMENT

Figure 1:
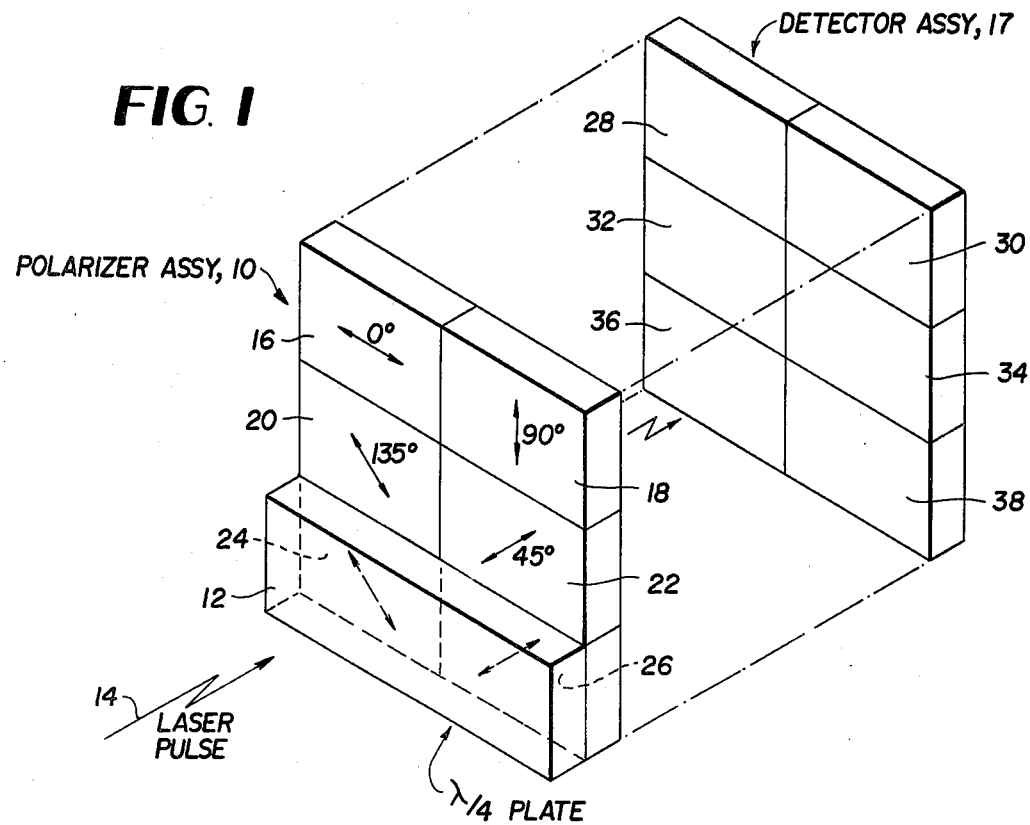
FIG. 1 is a perspective view of the optical elements utilized in the preferred embodiment of the subject invention.

The incident optical field E consisting of orthogonal components $E_x$ and $E_y$ when transmitted through a waveplate with a phase shift $\phi$ and a polarizer with its transmission axis set at $\theta$ is described by the following expression:

$$E(\theta,\phi)=E_x \cos\theta + E_y e^{i\phi}\sin\theta \quad (1)$$

The intensity I of the transmitted light beam can also be expressed as a function of the angles $\theta$ and $\phi$ according to the equation:

$$I(\theta,\phi)=E(\theta,\phi)E^*(\theta,\phi) \quad (2)$$

were $E^*$ represents the complex conjugate of the E field. Accordingly, $$I(\theta,\phi)=E_xE_x^* \cos^2\theta + E_yE_y^* \sin^2\theta + E_xE_y^* e^{-i\phi}\sin\theta\cos\theta + E_xE_y e^{i\phi}\sin\theta\cos\theta \quad (3)$$

The Stokes parameters of an optical beam can be defined as:

$$S_0=E_xE_x^*+E_yE_y^* \qquad S_2=E_xE_y^*+E_yE_x^*$$
$$S_1=E_xE_x^*-E_yE_y^* \qquad S_3=i(E_xE_y^*-E_yE_x^*) \quad (4)$$

Introducing these parameters $S_0$, $S_1$, $S_2$ and $S_3$ into equation (3) along with the half angle relations for the cosine and sine functions the intensity I of the transmitted beam now becomes:

$$I(\theta,\phi)=\tfrac{1}{2}[S_0+S_1\cos2\theta+S_2\sin2\theta\cos\phi-S_3\sin2\theta\sin\phi] \quad (5)$$

It can be shown that for a purely polarized beam only three of the Stokes parameters are necessary to describe the beam completely (ratio of semi-minor to semi-major axis and elliptical orientation). For the case of partially polarized light on the other hand, all four parameters must be known to specify uniquely the polarization state of the optical field.

This being the case, parameters $S_0$ through $S_3$ can be determined as follows:

If there is no phase plate in the optical path, then the angle $\phi=0$. Accordingly, equation (5) reduces to:

$$I(\theta,0)=\tfrac{1}{2}[S_0+S_1\cos2\theta+S_2\sin2\theta] \quad (6)$$

In a like manner, if a polarizer is introduced into the beam and oriented such that its transmission axis is set at $\theta=0$, then the intensity I becomes:

$$I(0,0)=\tfrac{1}{2}[S_0+S_1] \quad (7)$$

If on the other hand the polarizer is rotated through 90° such that the transmission axis is now parallel to the Y axis, the expression for the intensity becomes:

$$I(90°,0)=\tfrac{1}{2}[S_0-S_1] \quad (8)$$

Adding equations (7) and (8) yields the expression:

$$S_0 = I(0, 0) + I(90°, 0) \tag{9}$$

However, by subtracting equation (8) from (7) the parameters $S_1$ is obtained, being stated as:

$$S_1 = I(0, 0) - I(90°, 0) \tag{10}$$

The third Stokes parameter $S_2$ can be obtained by rotating the polarizer back to $\theta = 45°$. Then the intensity becomes:

$$I(45°, 0) = \tfrac{1}{2}[S_0 + S_2] \tag{11}$$

If the polarization angle $\theta$ is now made to be equal to 135° that is 90°+45° the intensity of I becomes:

$$I(135°, 0) = \tfrac{1}{2}[S_0 - S_2] \tag{12}$$

If equation (12) is subtracted from equation (11) the parameter $S_2$ now becomes:

$$S_2 = I(45°, 0) - I(135°, 0) \tag{13}$$

In order to determine parameter $S_3$, a quarter wave phase plate must be inserted into the optical path which introduces the phase shift of $\phi = 90°$. Accordingly, the intensity is now expressed as:

$$I(\theta, 90°) = \tfrac{1}{2}[S_0 + S_1 \cos 2\theta, S_3 \sin 2\theta] \tag{14}$$

If the polarization transmission axis angle $\theta$ is set to 45°, the intensity can be expressed as:

$$I(45°, 90°) = \tfrac{1}{2}[S_0 - S_3] \tag{15}$$

In a similar manner, if the polarizer is rotated such that $\theta = 135°$, then:

$$I(135°, 90°) = \tfrac{1}{2}[S_0 + S_3] \tag{16}$$

By subtracting equation (15) from (16), the parameter $S_3$ can be stated as:

$$S_3 = I(135°, 90°) - I(45°, 90°) \tag{17}$$

Thus it can be seen that the combination of an optical polarizer element and a quarter wave plate can be selectively utilized so that polarization of the beam can be uniquely determined. Where, however, laser pulses lasting only nano-seconds ($10^{-9}$ secs.) are present, a scheme using purely electromechanical operations which requires milliseconds to operate becomes unsuitable in actual practice. It is to this inherent limitation that the subject invention is directed.

Accordingly in the present invention, the Stokes parameters $S_0$, $S_1$, $S_2$ and $S_3$ are determined with respect to polarizer position and quarter wave plate insertion for six simultaneously measured intensity values as a function of the angles $\theta$ and $\phi$, that is:

$$S_0 = I(0, 0) + I(90°, 0) \tag{18}$$

$$S_1 = I(0, 0) - I(90°, 0) \tag{19}$$

$$S_2 = I(45°, 0) - I(135°, 0) \tag{20}$$

$$S_3 = I(135°, 90°) - I(45°, 90°) \tag{21}$$

Figure 2:
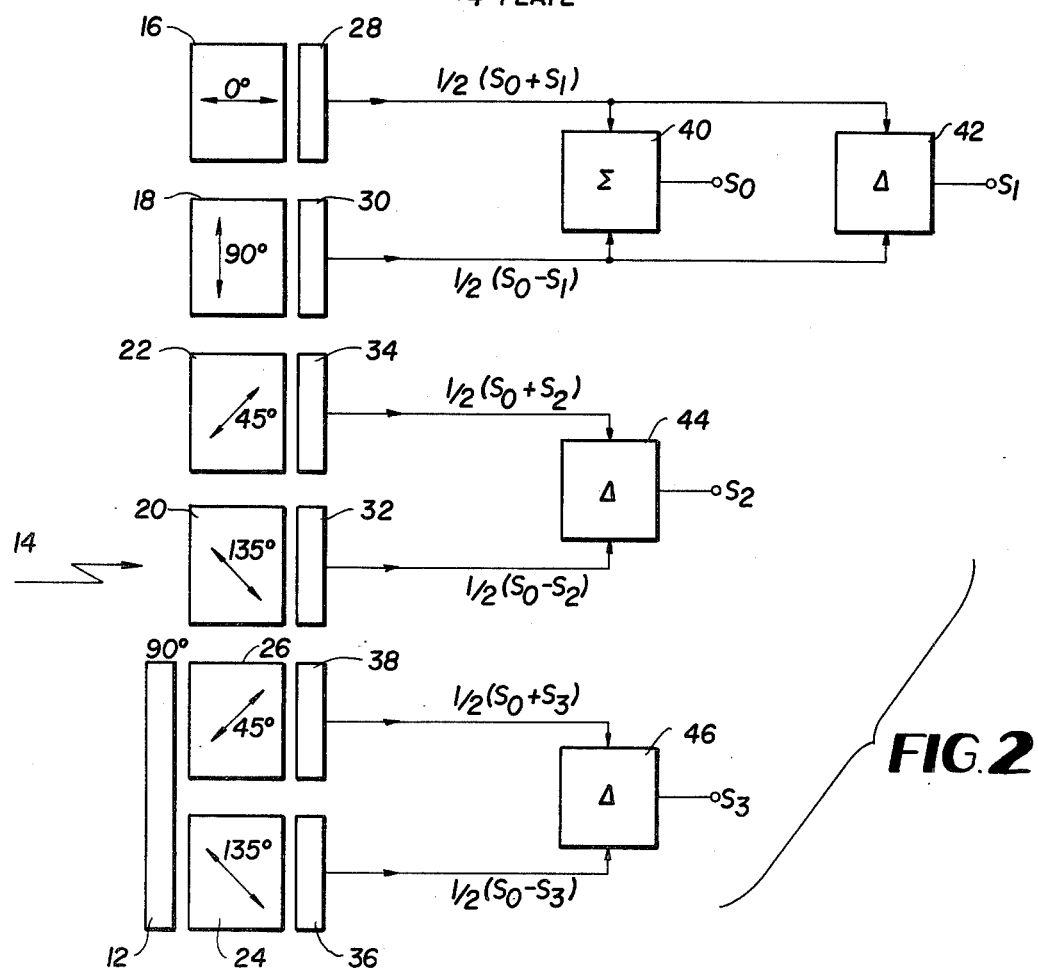
FIG. 2 is an electrical block diagram illustrative of the preferred embodiment of the subject invention.

As to the apparatus for making the six required simultaneous intensity measurements set forth in equations (18) through (21) reference is now made to FIGS. 1 and 2. Shown therein is a polarizer assembly 10 in front of which is placed a quarter wave plate 12. A pulse of optical energy 14 which may be, for example, a nanosecond laser pulse is directed toward this configuration. Directly behind the polarizer assembly 12 is an optical detector assembly.

The polarizer assembly 10 is shown consisting of six sections, each having a predetermined relative transmission axis angle $\theta$. More particularly, the first section 16 has its transmission axis angle $\theta$ equal to 0°. Its adjacent section 18 has its angle $\theta$ set at 90°. Immeditely below the section 16 is a third section 20, wherein $\theta = 135°$. Immediately below the section 18 is a fourth section 22 wherein the angle $\theta$ is made to be equal to 45°. The fifth and sixth sections 24 and 26 lie beneath the sections 20 and 22 respectively and are adapted to have transmission axis angles set at the same angle, that is 135° and 45°. The quarter wave plate 12 is placed only in front of the sections 24 and 26 of the polarizer assembly 10 as shown in FIG. 1.

The detector assembly 17 directly behind the polarizer assembly 10 is also comprised of six separate detector elements so that they are respectively responsive to the separate optical energies leaving the polarizer sections 16 through 26. Accordingly, optical detector 28 is positioned behind polarizer section 16 whereas detector 30 is located behind polarizer section 18. In a like manner, the detectors 32, 34, 36 and 38 are positioned behind polarizer sections 20, 22, 24 and 26.

With the configuration shown in FIG. 1, the intensity of the optical pulse 14 incident on the detector 28 becomes:

$$I(0, 0) = \tfrac{1}{2}(S_0 + S_1) \tag{22}$$

In a like manner, the intensity incident on detectors 30 through 38 become:

$$I(90°, 0) = \tfrac{1}{2}(S_0 - S_1) \tag{23}$$

$$I(135°, 0) = \tfrac{1}{2}(S_0 - S_2) \tag{24}$$

$$I(45°, 0) = \tfrac{1}{2}(S_0 + S_2) \tag{25}$$

$$I(135°, 90°) = \tfrac{1}{2}(S_0 - S_3) \tag{26}$$

$$I(45°, 90°) = \tfrac{1}{2}(S_0 + S_3) \tag{27}$$

As shown in FIG. 2, first and second operational amplifiers 40 and 42 configured as sum($\epsilon$) and difference($\Delta$) amplifiers, respectively, are coupled to the signal outputs of detectors 28 and 30 which are operable to provide signals corresponding to $\tfrac{1}{2}(S_0 + S_1)$ and $\tfrac{1}{2}(S_0 - S_1)$. Accordingly, it can be seen with respect to equations (22) and (23) that the output of summing amplifier 40 consists of a signal corresponding to the Stokes parameter $S_0$, while the output of the summing amplifier 42 consists of the Stokes parameter $S_1$. A third operational amplifier 44 configured as a difference amplifier is coupled to the signal outputs of detectors 34 and 32, which respectively provide signals corresponding to $\tfrac{1}{2}(S_0 + S_2)$ and $\tfrac{1}{2}(S_0 - S_2)$ according to equations (25) and (24). Accordingly, the output of the difference amplifier 44 will provide a signal corresponding to the Stokes parameter $S_2$. The remaining Stokes parameter $S_3$ is provided by a fourth operational amplifier 46 also configured as a difference amplifier, which is connected to the outputs of detectors 26 and 24, which respectively provide signals corresonding to ½(S₀+S₃) and ½(S₀−S₃).

Thus what has been shown and described is a means for automatically determining the polarization state of optical pulses of extremely short duration by simultaneously extracting Stokes parameters, which information can then be stored, for example, on a four channel tape recorder, not shown.

Having thus shown and described what is at present considered to be the preferred embodiment of the subject invention,

I claim:

1. A system for determining the polarization state of a pulse of optical energy in terms of Stokes parameters, comprising in combination:

a plurality of polarizer elements, having respective predetermined angles of transmissivity $\theta$ relative to a reference axis, arranged to commonly receive incident radiation of said pulse optical energy on the same wavefront without splitting;

wherein at least two of said plurality of polarizer elements have angles of transmissivity which are mutually orthogonal in a first orientation, means placed intermediate a selected number of said plurality of polarizer elements and said pulse to introduce a phase shift $\phi$ into one orthogonal component of said pulse, said pulse being adapted to be resolved into at least one pair of orthogonal components;

a respective plurality of optical detector means located relative to said plurality of polarizer elements so as to be responsive to the respective optical energy passing out of each of said polarizer elements and providing an electrical signal corresponding to the intensity of the optical energy incident thereto; and electrical circuit means selectively coupled to said plurality of optical detector means and being adapted to provide predetermined summation and differencing of said electrical signals to yield output signals corresponding to said Stokes parameters.

2. The system as defined by claim 1 wherein at least two polarizer elements have angles of transmissivity mutually orthogonal in a second orientation different from said first orientation, and wherein said selected number of polarizer elements comprise at least two polarizer elements having angles of transmissivity which are mutually orthogonal in said second orientation.

3. The system as defined by claim 2 wherein said means placed intermediate said selected number of polarizer elements comprises an optical wave plate.

4. The system as defined by claim 3 wherein said optical wave plate comprises a quarter wave plate.

5. The system as defined by claim 4 wherein said quarter wave plate introduces a phase shift angle $\phi=90°$, said at least two polarizer elements having angles of transmissivity which are mutually orthogonal in a first orientation have transmissivity angles $\theta=0°$ and 90° and wherein said at least two polarizer elements having angles of transmissivity which are mutually orthogonal in a second orientation have transmissivity angles $\theta=45°$ and 135°.

6. The system as defined by claim 5 wherein said electrical circuit means comprises first circuit means coupled to and being responsive to the optical energy from said at least two polarizer elements having respective angles of transmissivity $\theta=0°$ and 90° and being operable to sum the output signals therefrom to provide a first Stokes parameter signal $S_0$ where $S_0$ is a function of intensity $I(\theta, \phi)$ according to the equation $S_0=I(0, 0)+I(90°, 0)$;

second circuit means coupled to said aforementioned optical detector means for providing the difference of said output signals and accordingly produce a second Stokes parameter signal $S_1$ according to the equation $S_1=I(0, 0)-I(90°, 0)$;

third circuit means coupled to said optical detector means responsive to said at least two polarizer elements having angles of transmissivity $\theta=45°$ and 135° and being adapted to sum the output signals thereof to provide a third Stokes parameter signal $S_2$ according to the equation $S_2=I(45°, 0)-I(135°, 0)$; and fourth circuit means coupled to said optical detector means coupled to said at least two polarizer elements of said selected number of polarizer elements and being adapted to sum the outputs thereof to provide a fourth Stokes parameter signal $S_3$ according to the equation $S_3=I(135°, 90°)-I(45°, 90°)$.

7. The system as defined by claim 6 wherein said first circuit means comprises a summing circuit means and wherein said second, third and fourth circuit means comprises difference circuit means.

8. The system as defined by claim 7 wherein said summing circuit means and said difference circuit means are comprised of respective signal amplifiers.

9. The system as defined by claim 1 wherein said plurality of polarizer elements and said means placed intermediate a selected number of elements comprises a polarizer-wave plate mask consisting of six polarizer elements, two of which comprises said selected number of polarizer elements associated with said means placed intermediate therewith and said pulse.

10. The system as defined by claim 9 wherein said plurality of optical detector means comprises a set of fixed detectors arranged in a three-by-two matrix adjacent said plurality of polarizer elements.

* * * * *